United States Patent
Tsuruta et al.

[11] 3,914,112
[45] Oct. 21, 1975

[54] METHOD FOR CONNECTING STEEL FRAME COLUMNS OR THE LIKE IN BUILDING CONSTRUCTION

[75] Inventors: Shohsuke Tsuruta, Yokohama; Hisao Toyoda, Tokyo; Shiroh Kashiwa, Tokyo; Takeshi Kawabata, Higashi-Yamato; Yutaka Sumi, Tokyo, all of Japan

[73] Assignee: Ishikawajima-Harima Jukogyo Kabushiki Kaisha, Tokyo, Japan

[22] Filed: June 21, 1974

[21] Appl. No.: 481,609

Related U.S. Application Data

[63] Continuation of Ser. No. 376,974, July 6, 1973, which is a continuation of Ser. No. 152,354, June 11, 1971, abandoned.

[52] U.S. Cl. .............................. 29/155 C; 228/168
[51] Int. Cl. ........................................... B23k 31/08
[58] Field of Search............ 29/471.1, 472.1, 470.5, 29/470.7

[56] References Cited
UNITED STATES PATENTS

| | | | |
|---|---|---|---|
| 497,808 | 5/1893 | Moxham | 219/106 |
| 782,056 | 2/1905 | Richardson | 29/470.5 |
| 1,410,647 | 3/1922 | Bovard | 52/758 |
| 1,819,287 | 8/1931 | Goerz | 29/470.7 X |
| 2,053,216 | 9/1936 | Deming | 29/472.1 |
| 2,451,099 | 10/1948 | LaMotte | 29/472.1 |
| 3,442,542 | 5/1969 | Watanabe | 52/760 |
| 3,628,300 | 12/1971 | Tsurumi | 52/758 |

*Primary Examiner*—Al Lawrence Smith
*Assistant Examiner*—Marc R. Davidson
*Attorney, Agent, or Firm*—Nolte and Nolte

[57] ABSTRACT

A spacer is interposed between the edges to be connected of two steel frame column members H-shaped in section formed by welding or rolling, so as to form square grooves of a narrow gap between the flanges of said two steel frame column members to be connected by welding.

3 Claims, 34 Drawing Figures

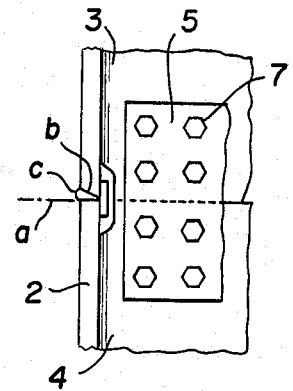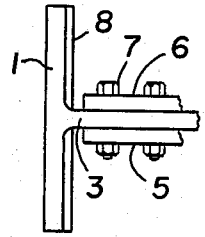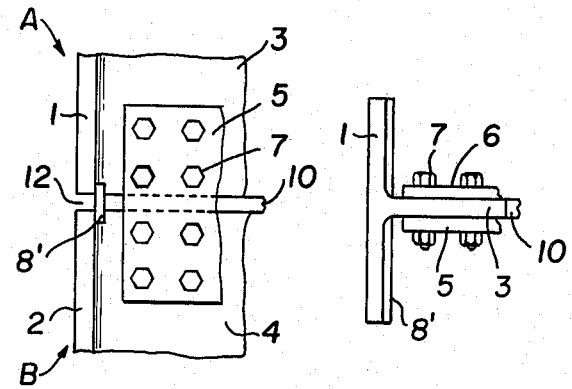
FIG.1 PRIOR ART　　FIG.2 PRIOR ART　　FIG.7　　FIG.8
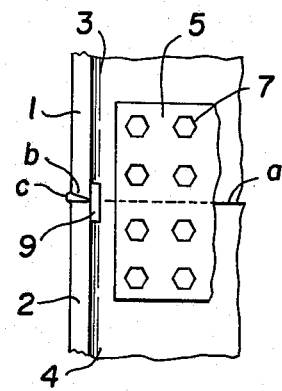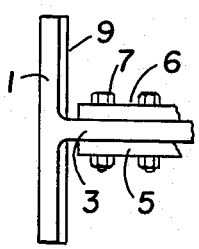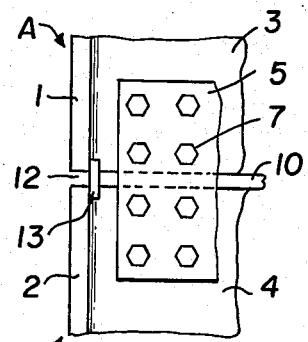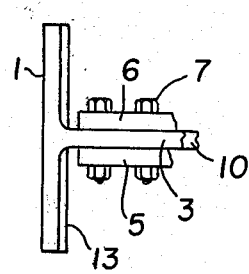
FIG.3 PRIOR ART　　FIG.4 PRIOR ART　　FIG.9　　FIG.10
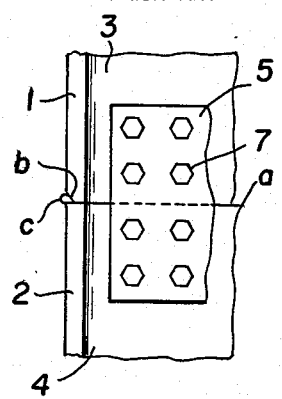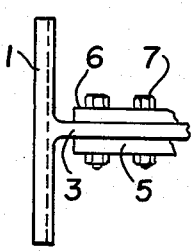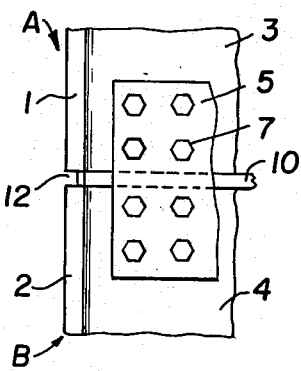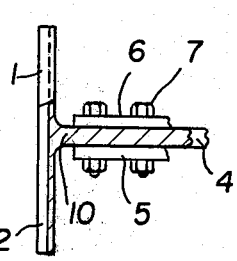
FIG.5 PRIOR ART　　FIG.6 PRIOR ART　　FIG.11　　FIG.12
INVENTORS
SHOHSUKE TSURUTA
HISAO TOYODA
SHIROH KASHIWA
TAKESHI KAWABATA
YUTAKA SUMI
BY Nolte & Nolte
ATTORNEYS

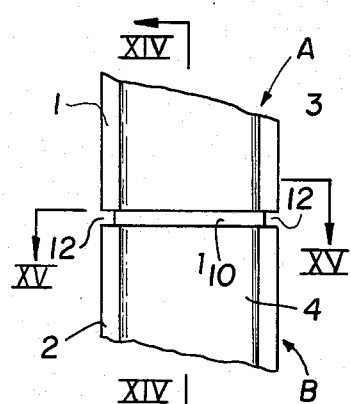
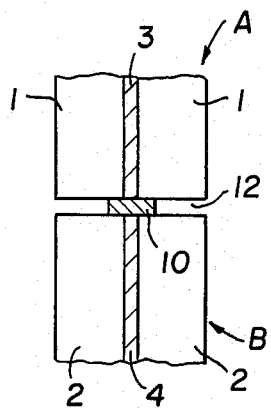
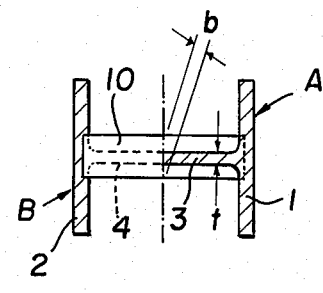
FIG.13   FIG.14   FIG.15
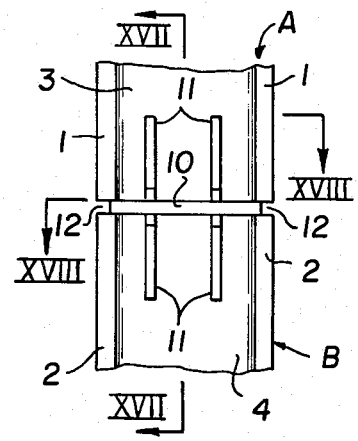
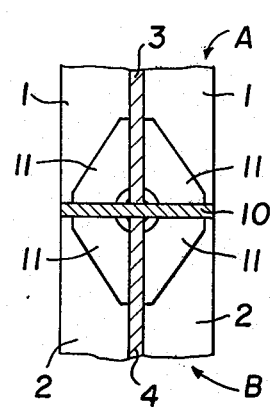
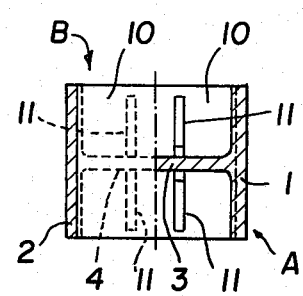
FIG.16   FIG.17   FIG.18
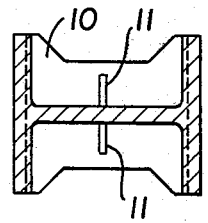
FIG.19

3,914,112

METHOD FOR CONNECTING STEEL FRAME COLUMNS OR THE LIKE IN BUILDING CONSTRUCTION

This is a continuation of application Ser. No. 376,974, filed July 6, 1973 which is a continuation of Ser. No. 152,354, filed June 11, 1971, now abandoned.

DETAILED EXPLANATION OF THE INVENTION

The present invention relates to generally a structural connection, and more particularly a method for connecting steel frame column members or the like H-shaped in section in building construction.

Briefly stated, the present invention provides a method for connecting by welding steel frame column members or the like H-shaped in section in building construction characterized by the steps of preparing the surfaces of the edges to be connected of two steel frame column members H-shaped in section formed by welding or rolling, to have a planar surface perpendicular to the longitudinal axis of said steel column members, interposing a thin spacer between the webs of said two steel column members so as to form square grooves of a narrow gap between the flanges to be connected of said two steel column members, and joining said two steel column members by welding at said square grooves.

In the building construction industry, H-section steel construction pillars are used for structural support in tall or multi-story structures. As is well known in this industry, the H-section construction pillars which weigh hundreds of pounds or more are used to form the vertical columns of H-section construction pillars in the structure. The expression "H-section construction pillars" as used herein means those heavy pillars used in the construction of tall or multi-story structures.

The primary object of the present invention is to provide a new and novel method for connecting by welding steel frame column members or the like H-shaped in section which may reduce the welding time, require less filler metal and reduce the effects of heating by welding on the structural members.

The present invention will become more apparent from the following description of the preferred embodiments thereof taken in conjunction with the accompanying drawings.

FIGS. 1–6 are views for explanation of the prior art structural connection methods by welding;

FIG. 1 is a fragmentary side view, partly in section of two H-shaped steel column members to be connected by welding when complete or 100 percent penetration through the thickness of the flanges is required;

FIG. 2 is a top view thereof;

FIG. 3 is a fragmentary side view, partly in section of two H-shaped steel column members to be connected by welding when complete or 100 percent penetration through the thickness of the flanges is required;

FIG. 4 is a top view thereof;

FIG. 5 is a view similar to FIG. 1, but illustrating the case when only a partial penetration is required;

FIG. 6 is a top view thereof;

FIGS. 7–24 are views for explanation of the method of the present invention,

Figure 20:
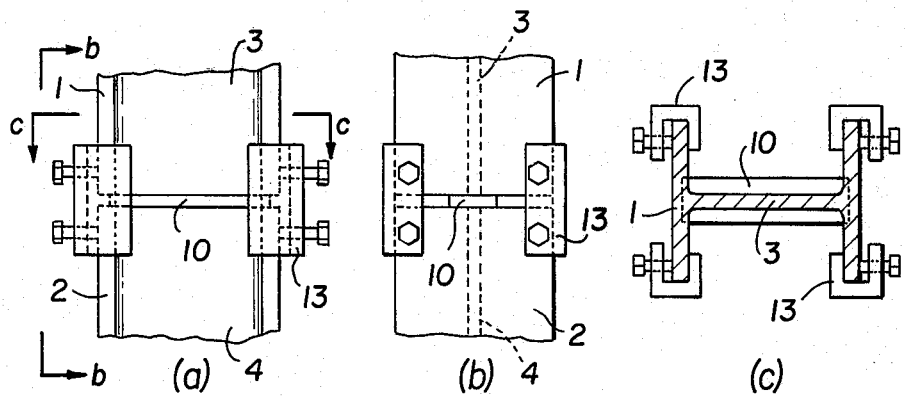

FIGS. 7–12 illustrating the embodiments thereof where a spacer having a width equal to or slightly smaller than the thickness of the webs of the structural column members to be connected is used;

FIG. 7 is a fragmentary side view, partly in section, of two column members to be connected wherein complete or 100 percent penetration throughout the thickness of the flanges is required, and a backing strip of refractory material is employed;

FIG. 8 is a top view thereof;

FIG. 9 is a view similar to FIG. 7, but illustrating the case in which backing metal is used when complete or 100 percent penetration is required;

FIG. 10 is a top view thereof;

FIG. 11 is also a view similar to FIG. 7, but illustrating the case requiring only a partial penetration;

FIG. 12 is a top view thereof;

FIGS. 13–24 illustrate other embodiments of the present invention in which spacer having a width greater than the thickness of the webs is used;

FIG. 13 is a side view illustrating the welding process between the spacer and the webs of the steel column members;

FIG. 14 is a view looking in the direction indicated by the arrows XIV—XIV of FIG. 13;

FIG. 15 is a view looking in the direction indicated by the arrows XV—XV of FIG. 13;

FIG. 16 is a side view illustrating the joint by welding among the spacer, the webs and ribs to further strengthen the joint;

FIG. 17 is a view looking in the direction indicated by the arrows XVII—XVII of FIG. 16;

FIG. 18 is a view looking in the direction indicated by the arrows XVIII—XVIII of FIG. 16;

FIG. 19 is a top view when a number of ribs are reduced while a variation of spacer is used; and FIGS. 20–24 are views for explanation of the method of erection and alignment of the column members for tack welding, which method is used in the present invention;

FIGS. 20a–24a being the side views,

FIGS. 20b–24b being the side views looking in the direction indicated by the arrow b of FIGS. 20a–24a, and FIGS. 20c–24c being the top views looking in the direction indicated by the arrow c of FIGS. 20a–24a.

First referring to FIGS. 1–6, the prior art structural connection methods will be discribed briefly for the sake of better understanding of the present invention. One edge a to be connected is cut by oxygen cutting or "cold-sawing," and then the edges of the flange 1 are beveled to have single-bevel or single-J grooves. Webs 3 and 4 are connected with splice plates 5 and 6, which are fixed to the two surfaces thereof with high-strength bolts 7. Welding is accomplished with the use of backing metal 8 or refractory material member 9. From the foregoing, it is seen that the step of edge preparation is required in the prior art structural connection methods in addition to the step of cutting the edges of the structural members to be connected. This means, of course, an increase in step and cost. Furthermore the single-bevel or single-J grooves are used so that the greater the thickness of the structural members to be connected, the greater the quantity of filler metal. Therefore much heat is transferred from the filler metal to the structural members or base-metals so that they become more ductile and are easily subjected to greater deformations. Moreover, because of the single-bevel or single-J grooves, welding is difficult to be accomplished by automatic welding equipment.

The present invention was made to eliminate these defects in the prior art structural connection methods, and will become apparent from the following description of the preferred embodiments thereof taken in conjunction with the accompanying drawing, especially FIGS. 7–24.

FIGS. 7 and 8 illustrate the first embodiment of the present invention in which 100 percent penetration throughout the whole thickness of the flanges 1 and 2 must be attained, and solid flux or refractory material is used as a backing strip 8'. The edges of two steel structural members H-shaped in section, which may be formed by welding or rolling, are cut by oxygen cutting or cold-sawing along a plane perpendicular to the longitudinal axis of each of the structural members A and B, and a thin spacer 10 of steel or cast-steel is interposed between the upper and lower webs 3 and 4 so that the smaller square faces are formed between the upper and lower flanges 1 and 2 of the structural members A and B to be connected. It is preferable that the thickness of the spacer 10 is 9 – 16 milimeters to attain the optimum welding results and that its width is substantially equal to or slightly less than the thickness of the webs 3 and 4. The splice plates 5 and 6 are connected to the two surfaces of the webs 3 and 4 with the high-strength bolts 7. Thereafter the two structural members A and B are joined together by welding at 12.

FIGS. 9 and 10 illustrate the second embodiment in which 100 percent penetration through the thickness of the flanges 1 and 2 is required with the use of a backing strip 13. The second embodiment is similar to the first embodiment except that instead of the refractory material member 8' used in the first embodiment, the backing strip 13 is used, so that further description will not be necessary.

FIGS. 11 and 12 illustrate the third embodiment of the present invention in which the flanges are partially penetrated. The third embodiment is substantially similar to the first embodiment described with reference to FIGS. 7 and 8, but the flanges 1 and 2 are required only to be partially penetrated, a smaller, H-shaped spacer 10 is used. Connection with the splice plates 5 and 6 fixed in position with the high strength bolts 7 and welding are similar to the first embodiment.

The fourth embodiment of the present invention is illustrated in FIGS. 13–15, in which the spacer 10 having the width greater than the thickness of the webs 3 and 4 is interposed between the two steel structural members A and B to be connected. The edges of the two structural members A and B are cut by oxygen cutting or cold-sawing along a plane perpendicular to the longitudinal axis of the structural members A and B, and the spacer 10 made of steel plate or cast-steel plate is interposed between the webs 3 and 4. In this case as described above, the width b of the spacer 10, which is in parallel with the webs 3 and 4, is greater than the thickness t thereof, and the front and rear edges of the spacer 10 are partially placed between the flanges 1 and 2 inwardly thereof as best shown in FIGS. 13 and 15 so that the narrow square grooves are formed therebetween. The spacer 10 is joined to the webs 3 and 4 by continuous or intermittent welding along their joint lines. Thereafter, the structural members are joined by welding at 12.

FIGS. 16–19 illustrate the fifth embodiment of the present invention in which the webs 3 and 4 of the two steel structural members A and B may be more securely and reliably joined together with the use of the spacer 10 and ribs 11. As in the case of the fourth embodiment described with reference to FIGS. 13–15, the narrow square grooves 12 are formed between the flanges 1 and 2 by the interposition of the spacer 10. Thereafter, the spacer 10 is joined to the webs 3 and 4 by continuous or intermittent welding along their lines of contact or weld lines, and the ribs 11 are welded to the spacer 10 and the webs 3 and 4. Finally the two steel structural members A and B are joined by welding at 12 in the similar manner as described hereinabove.

In the first to fifth embodiments described above, the spacer 10 may be previously welded to the structural member B in the factory in order to facilitate the positioning of the spacer 10 and consequently the construction works. For example, the spacer 10 is welded to the upper end of the structural member B to be connected to the member A, and furthermore the ribs 11 are also joined by welding to the spacer 10 and to the web 2 of the structural member B. This weldment is transported to a construction site, where it is lifted to be placed or erected upon the structural member A. Therefore the narrow square grooves 12 are formed between the flanges 1 and 2, and after the spacer 10 is joined by welding to the web 3 of the lower structural member A, the ribs 11 are joined by welding to the web 3 and the spacer 10. Thereafter the structural members A and B are joined by welding at 12.

Next referring to FIGS. 20–24, a method for erecting one column member upon another and aligning them for tack welding will be disclosed. This method may be advantageously used in the structural member connection method of the present invention described hereinabove.

In the sixth embodiment illustrated in FIG. 20, the columns are erected and placed in position with the use of a vice jig 13, and after tack welding the webs 3 and 4 to the spacer 10, the jig 13 is removed.

Figure 21:
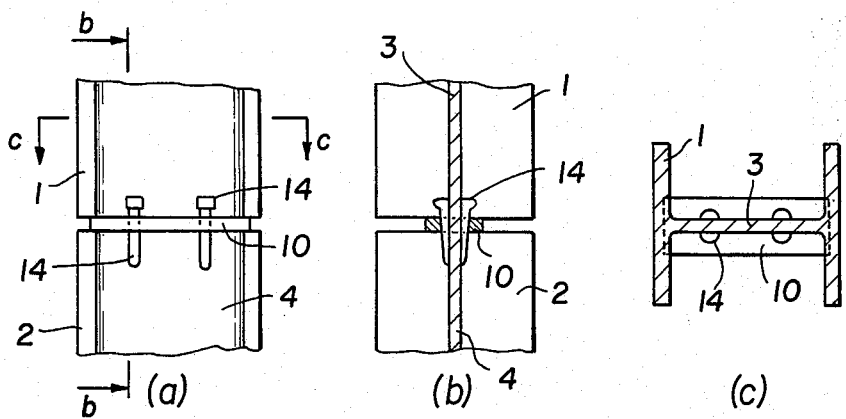

In the seventh embodiment illustrated in FIG. 21, the positioning wedges 14 are used, and the after the webs 3 and 4 are welded to the spacer 10, the wedges 14 are removed.

Figure 22:
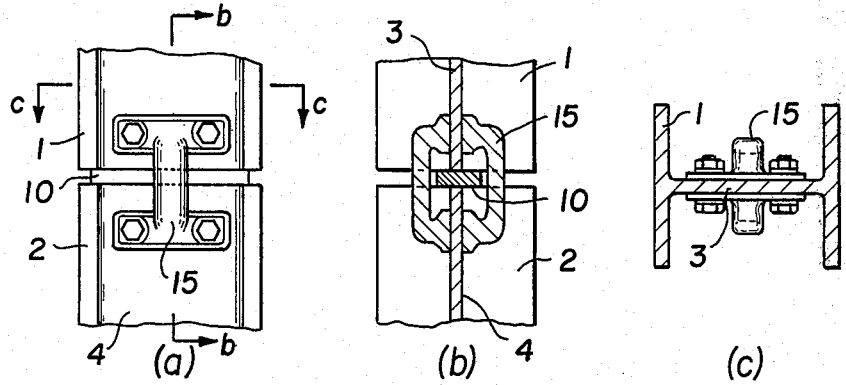

In the eighth embodiment illustrated in FIG. 22, a strong-back 15 is used for tack welding, and after the webs 3 and 4 are welded to the spacer 10, the strong-back 15 is removed.

Figure 23:
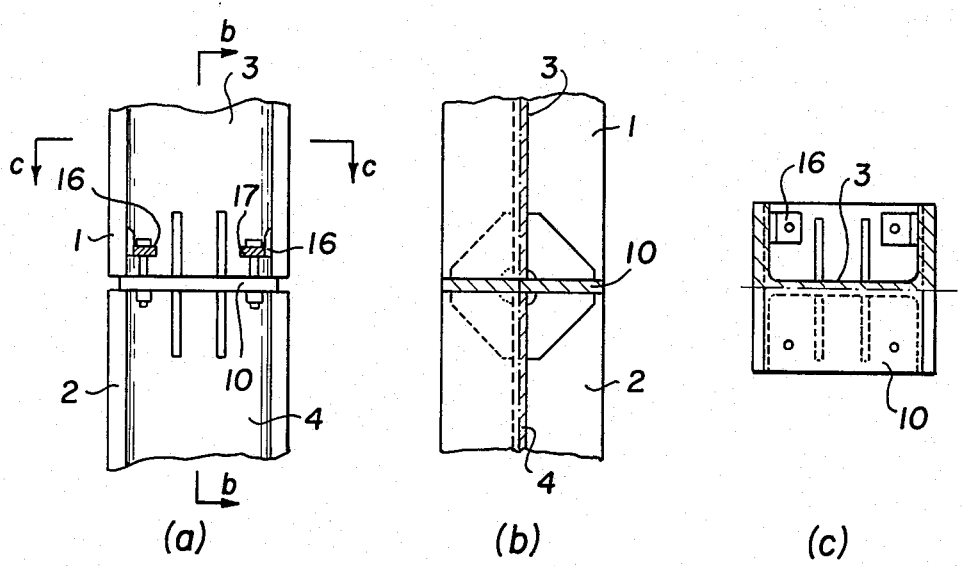

In the ninth embodiment illustrated in FIG. 23, the jigs 16 for tack welding are used, and after the webs 3 and 4 are welded to the spacer 10, the hatched portion is removed or cut off if required.

Figure 24:
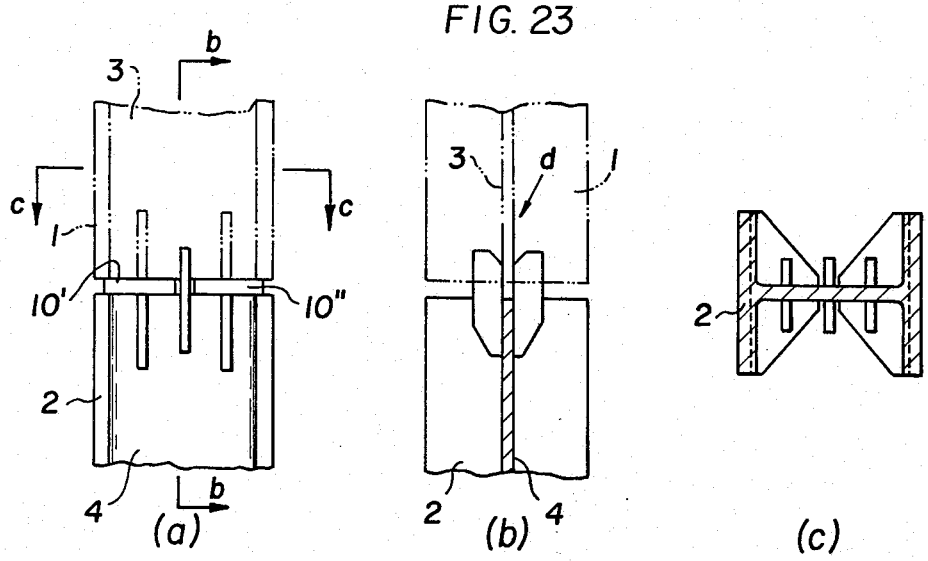

In the tenth embodiment illustrated in FIG. 24, two shorter spacers 10' and 10'' are interposed between the webs so that they may be more accurately placed in position. As indicated by the arrow d, the web of the upper column member is inserted into the slot so that the alignment between the upper and lower column members may be accomplished in a simple manner yet with a higher degree of accuracy.

From the foregoing description, it is seen that according to the present invention, two steel-column structural members H-shaped in section, which are generally so shaped by welding or rolling, are so processed that the edges to be connected to each other are cut along a plane perpendicular to the longitudinal axis of the column members, and a thin spacer is placed at least between the webs of the column members to form narrow square grooves between the flanges to be connected. Therefore, the present invention has the following advantages.

I. The edge preparation is simplified because the square grooves are naturally formed by interposing the spacer between the as-cut edges of the structural members to be connected, the edges being cut by cold sawing or the like. In other words, the steps of beveling the edges may be eliminated.

II. Since the thickness of the spacer is smaller, the square grooves become smaller accordingly. This means the reduction both in quantity of filler metal and welding time. In addition, the heat transfer from filler metal to the base-members is less so that effects caused on the structural members of heating by welding may be minimized.

III. Since the edge preparation is simple, the horizontal welding equipment may be advantageously employed. This means that the automatic welding is feasible.

When the spacer having a width equal to or slightly smaller than the thickness of the web of the structural member:

IV. The webs of the two structural members to be connected are connected with the splice plates so that welding may be accomplished in a well safeguarded manner.

In case the width of the spacer (in the direction perpendicular to the web) is made greater than the thickness of the web and the spacer is welded to the webs. In case of the width of the spacer is made greater so that the ribs may be welded to both the spacer the webs:

V. The splice plates and the high-strength bolts may be eliminated. That is, the step for drilling the bolt holes and bolting may be eliminated. Thus the construction time may be much saved, and the joints may have higher strength because no bolt holes are formed.

VI. The fabrication of the spacers having a width greater than the thickness of the web may become easy.

VII. Because of the advantages disclosed in (V) and (VI), the overall construction time may be much shortened.

VIII. Labor saving on construction site may be accomplished.

IX. When the thickness of the webs of the structural or column members for construction of a tall building becomes greater than for example 40 mm, it becomes difficult to join the webs by welding the structural or column members while they are placed in position with the splice plates and high-strength bolts. But when the spacers having a width greater than the thickness of the web is employed, not only the flanges but also the webs may be joined together by welding.

What is claimed is:

1. A method of forming a vertical column of H-section construction pillars which comprises forming coplanar surfaces on the flanges and webs of the pillars, the plane of said surfaces being perpendicular to the longitudinal axes of the pillars, erecting a lower pillar with its longitudinal axis substantially vertical, locating a flat spacer atop the lower pillar and on said surface of the web of that pillar, said spacer having a dimension in the horizontal direction parallel to the plane of the web at least equal to the length of the web between the flanges locating an upper pillar vertically atop the spacer and aligned with the lower pillar and supporting the weight of the upper pillar on the spacer, said locating step including positioning the spacer to form a welding groove for joining the upper and lower pillars said groove being defined by the said surfaces of said flanges of the pillars and a substantially vertical surface of said spacer, said surface of said spacer being disposed in a plane normal to the plane of the webs of the pillars, and welding the beams and spacer together at the groove so formed by depositing weld material into said groove.

2. A method as claimed in claim 1 wherein the horizontal dimension of the spacer normal to the plane of the webs of the pillars and, in the region of webs of said pillars is no greater than the thickness of the webs, normal to the plane of the webs, and splice plates are secured to opposite sides of said webs prior to welding.

3. A method of forming a vertical column of H-section construction pillars which comprises forming coplanar surface on the flanges and webs of the pillars, the plane of said surfaces being perpendicular to the longitudinal axes of the pillars erecting a lower pillar with its longitudinal axis substantially vertical, locating a spacer atop the lower pillar and on said surface of the web of that beam, said spacer having a dimension in the horizontal direction parallel to the plane of the web at least equal to the length of the web between the flanges locating an upper pillar vertically atop the spacer and aligned with the lower pillar and supporting the weight of the upper pillar on the spacer whereby a welding groove for joining the upper and lower pillars is defined by the said surfaces of said flanges of the pillars and a substantially vertical surface of said spacer, said surface of said spacer being disposed in a plane normal to the plane of the webs of the pillars, and welding the beams and spacer together at the groove so formed and wherein the horizontal dimension of the spacer normal to the plane of the webs of the pillars and, in the region of webs of said pillars is greater than the thickness of said webs, normal to the plane of said webs, and said webs are welded to the spacer.

* * * * *